US012356308B2

United States Patent
Mahasenan et al.

(10) Patent No.: US 12,356,308 B2
(45) Date of Patent: *Jul. 8, 2025

(54) END DEVICE COMMUNICATION

(71) Applicant: Apple Inc., Cupertino, CA (US)

(72) Inventors: Arun Vijayakumari Mahasenan, Fremont, CA (US); Sarvesh Kumar Varatharajan, Sunnyvale, CA (US); Venkateswara Rao Manepalli, San Jose, CA (US); Yaranama Venkata Ramana Dass, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,508

(22) Filed: Apr. 29, 2024

(65) Prior Publication Data
US 2024/0284296 A1    Aug. 22, 2024

Related U.S. Application Data

(63) Continuation of application No. 17/669,868, filed on Feb. 11, 2022, now Pat. No. 11,997,581.

(51) Int. Cl.
*H04W 40/04* (2009.01)
*H04W 52/02* (2009.01)
(Continued)

(52) U.S. Cl.
CPC ....... *H04W 40/04* (2013.01); *H04W 52/0216* (2013.01); *H04W 80/02* (2013.01); *H04W 84/18* (2013.01)

(58) Field of Classification Search
None
See application file for complete search history.

(56) References Cited

U.S. PATENT DOCUMENTS

| 8,532,003 | B2 | 9/2013 | Pandey et al. | |
| 11,997,581 | B2 * | 5/2024 | Mahasenan | H04W 52/0216 |

(Continued)

FOREIGN PATENT DOCUMENTS

WO    2021231991 A1    11/2021

OTHER PUBLICATIONS

International Search Report and Written Opinion for PCT Application No. PCT/US2023\012228 dated May 15, 2023; 11pgs.

*Primary Examiner* — Diane L Lo
(74) *Attorney, Agent, or Firm* — FLETCHER YODER PC

(57) ABSTRACT

Embodiments disclosed herein relate to enabling direct wireless device-to-device communication between sleepy end devices (SEDs) of a mesh (e.g., Thread®) network. A router may forward packets between end devices of the mesh network. However, if the router is not available, SEDs may not be able to communicate with each other using a mesh protocol. Embodiments presented herein enable end devices of the mesh network to communicate directly, without a router. Some embodiments are directed to changing a role of an end device to temporarily act as a router for a particular target end device. The role change may be based on a trigger event and may be temporary until a target action is performed by the target end device. In some embodiments, the end devices continue to operate as SEDs and use coordinated sampled listening techniques to communicate via the mesh protocol.

20 Claims, 6 Drawing Sheets

(51) Int. Cl.
  *H04W 80/02* (2009.01)
  *H04W 84/18* (2009.01)

(56) References Cited

U.S. PATENT DOCUMENTS

| | | |
|---|---|---|
| 2012/0083305 A1 | 4/2012 | Alexander et al. |
| 2013/0315079 A1 | 11/2013 | Edge |
| 2014/0269406 A1 | 9/2014 | Nanni |
| 2017/0208531 A1 | 7/2017 | Huang |
| 2021/0168635 A1 | 6/2021 | Knode |
| 2021/0185485 A1 | 6/2021 | Deixler et al. |
| 2021/0352002 A1 | 11/2021 | Knode |
| 2021/0385771 A1 | 12/2021 | Hui |

* cited by examiner

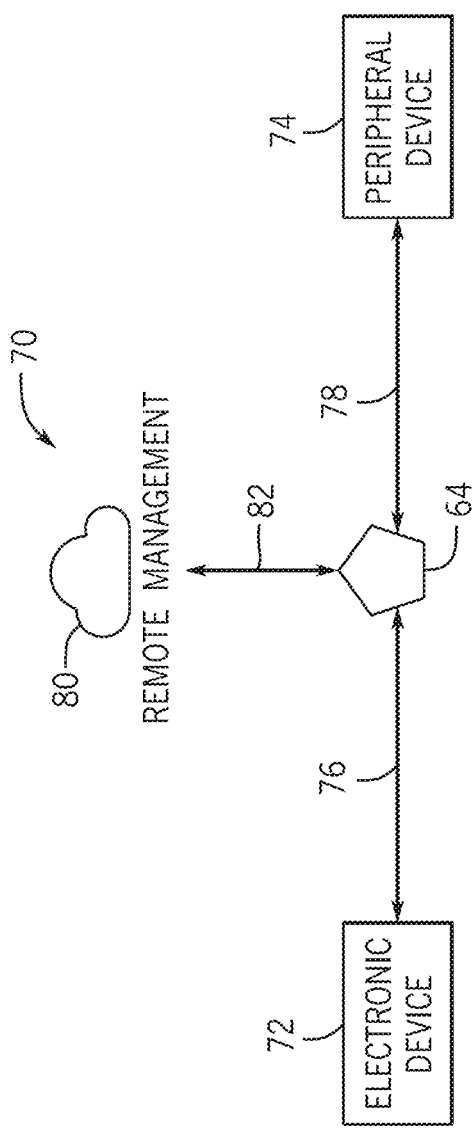
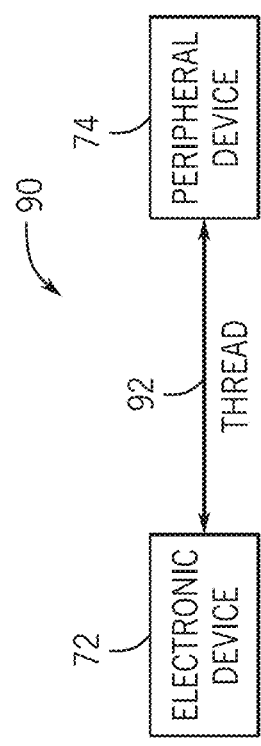

END DEVICE COMMUNICATION

CROSS-REFERENCE TO RELATED APPLICATIONS

This application is a continuation of U.S. patent application Ser. No. 17/669,868 filed Feb. 11, 2022, entitled "END DEVICE COMMUNICATION," the disclosure of which is incorporated by reference in its entirety for all purposes.

BACKGROUND

The present disclosure relates generally to wireless communication, and more specifically, to wireless device-to-device communication using various communication protocols.

A mesh network (e.g., a Thread® network) may include router devices to forward packets between end devices of the network. That is, the end devices communicate with a corresponding router of the network, but may not forward packets for other network devices. In this way, the router may act as a parent device for the end devices. However, if a router is not available (e.g., out of range), then the end devices of the mesh network may not be able to communicate with one another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

When a parent device (e.g., a router) of a mesh network, such as a Thread® network, is not available, end devices of the mesh network may not be able to communicate with one another. For example, the parent device may forward packets (e.g., data) between one or more end devices of the mesh network. The parent device may become unavailable, for example, if a power failure of the parent device occurs, the parent device is not within communication range of the end devices, or some other communication error occurs. In that case, the end devices may not be able to communicate with one another.

The end devices of the network may be sleepy end devices (SEDs) that are normally disabled and wake on occasion to poll for messages from the parent device (e.g., a router). Embodiments presented herein provide techniques which enable the end devices to communicate directly between one another (e.g., without an intervening communication device forming a connection between the end devices, such as the parent device). In some embodiments, a first end device may be promoted to act as a router for the mesh network with respect to at least one other end device (e.g., a second end device). In some embodiments, a first end device may continue to operate as a sleepy end device and use coordinated sampled listening (CSL) techniques to communicate (e.g., via the Thread® protocol).

In one embodiment, an electronic device is presented. The electronic device includes a receiver configured to receive data from a peripheral device via a first communication protocol through a routing device. The electronic device also includes a transmitter configured to transmit data to the peripheral device via the first communication protocol through the routing device. The electronic device also includes one or more processors configured to receive a first set of time periods for receiving data using the receiver or transmitting data using the transmitter via a second communication protocol. The one or more processors are also configured to determine a second set of time periods for receiving data using the receiver or transmitting data using the transmitter via the first communication protocol based on the first set of time periods. The one or more processors are also configured to cause the receiver to receive data or cause the transmitter to transmit data directly to the peripheral device without the routing device via the first communication protocol during the second set of time periods.

In another embodiment, a method is presented which includes detecting, using a transceiver of an electronic device, a trigger event associated with a peripheral device. The method also includes determining, using the transceiver, that a router using a communication protocol is unavailable to enable communication between the electronic device and the peripheral device. The method also includes changing, using processing circuitry of the electronic device, a role of the electronic device according to the communication protocol to communicate directly with the peripheral device. The method also includes establishing, using the transceiver, a direct link with the peripheral device according to the communication protocol. The method also includes transmitting, using the transceiver, an instruction to the peripheral device to perform a target action.

In yet another embodiment, an electronic device is presented including a first transceiver for wireless communication according to a first communication protocol. The first transceiver is configured to communicate with a peripheral device via the first communication protocol and through a parent device. The electronic device also includes a second transceiver for wireless communication according to a second communication protocol. The electronic device also includes one or more processors configured to determine a proximity of the electronic device to the peripheral device using the second transceiver according to the second communication protocol. The one or more processor are also configured to enable the first transceiver to communicate directly with the peripheral device according to the first communication protocol based on the proximity of the electronic device to the peripheral device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 4 is a schematic diagram of a communication system including an electronic device (e.g., as shown in FIG. 1) and a peripheral device using the network of FIG. 3, according to embodiments of the present disclosure.

FIG. 5 is a schematic diagram of a device-to-device communication system including an electronic device (e.g., as shown in FIG. 1) and a peripheral device, according to embodiments of the present disclosure.

DETAILED DESCRIPTION OF SPECIFIC EMBODIMENTS

Figure 1:
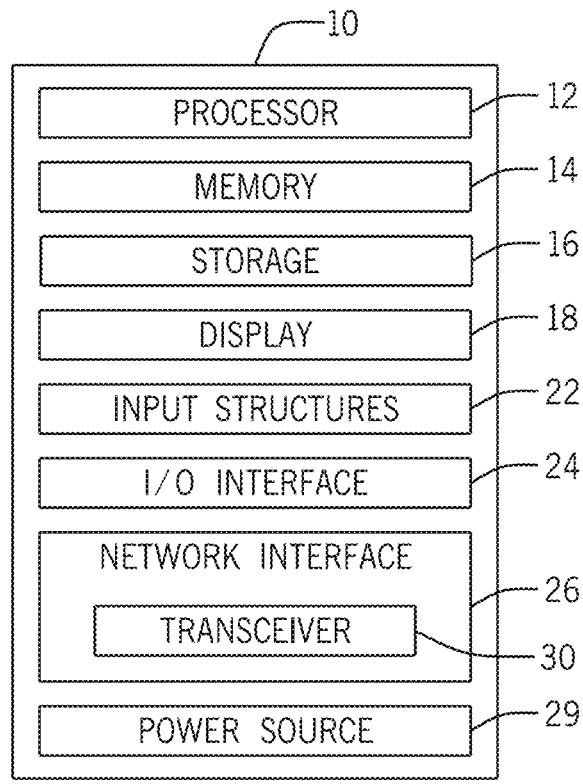
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to enabling communication between end devices of a network. In some cases, communication may be enabled via a temporary connection (e.g., on an as-needed basis). Specifically, the network may include a mesh network (e.g., a Thread® network) and the communication between devices may be in accordance with the mesh network protocol. For example, the Thread® protocol typically utilizes a router to forward packets between end devices of the Thread® network. That is, the Thread® router may act as a parent device for the end devices. As such, an end device may utilize a radio to transmit a message to another end device via the router. While the Thread® network is used as an example of a mesh network, it should be understood that the concepts disclosed herein may also be applied to other networks, including Zigbee®, Z-Wave®, Bluetooth Low Energy (BLE), ISA100.11a, WirelessHART®, MiWi™, IPv6 over Low-Power Wireless Personal Area Networks (6LoWPAN), Subnetwork Access Protocol (SNAP), Wi-Fi mesh networks, and the like.

As an example, the router may forward information between the Thread® network and a non-Thread® network, such as a Wi-Fi network. In that case, the router may be referred to as a "border router" and convert a Wi-Fi message to the Thread® protocol and transmit the converted Thread® message to the target end device using a Thread® radio. The Thread® radio may be defined by the IEEE 802.15.4 standard for low-rate wireless personal area networks (LR-WPANs).

In some cases, the end devices may be sleepy end devices (SEDs) which are normally disabled (e.g., asleep) and wake on occasion to poll for messages from a parent device (e.g., the router). In some cases, an SED may awaken when a "wakeup message" is received. The wakeup message may instruct the SED to wake-up to poll for messages at a time different than a schedule polling period. For example, the router may transmit the wakeup message to the SED.

However, if the router of the Thread® network is unavailable, the end devices (including the SEDs) may not be able to communicate with each other using the Thread® protocol. For example, the router may be unavailable due to proximity (e.g., a distance) from the end devices, a power failure of the router, or another issue with the router or communication from the router. Moreover, the end devices may be unable to use other communication protocols (e.g., BLUETOOTH®, ultra-wideband (UWB), etc.) to communicate with one another. For example, while some end devices may communicate using BT or Bluetooth Low Energy (BLE), others may not have such capabilities. Thus, a direct communication between end devices (e.g., without an intervening communication device, such as via a peer-to-peer or device-to-device connection) may not be possible if the router is not available.

Embodiments presented herein provide techniques which enable the end devices to communicate directly with each other (such as via a peer-to-peer or device-to-device connection), without the router. In some embodiments, an end device may be prompted to temporarily act as a router (e.g., a Thread® router) for another end device. In some embodiments, the end devices may continue to operate as SEDs and use coordinated sampled listening (CSL) techniques to communicate (e.g., via the Thread® protocol). Advantageously, embodiments presented herein enable end devices of a mesh network (e.g., a Thread® network) to communicate even when a parent device (e.g., a router) is not available to forward communications therebetween.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface (e.g., a wireless interface) 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network and/or wireless interface 26, and/or the power source 29 may each be communicatively coupled directly or indirectly (e.g., through or via another component, a communication bus, a wireless connection, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. In some cases, the electronic device 10 may be representative of a router, an end device, and/or a sleepy end device (SED) of a Thread® network, as discussed herein.

It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network and/or wireless interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network and/or wireless interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), for a low-rate wireless personal are network (LR-WPAN), such as employing the IEEE 802.15.4 protocol (e.g., a mesh network, such as a Thread® network), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, a mesh network such as a Thread® network, and so forth).

The network and/or wireless interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network and/or wireless interface 26 may include a transceiver 30. In some embodiments, all or portions of the transceiver 30 may be disposed within the processor 12. The transceiver 30 may support transmission and receipt of various wireless signals via one or more antennas. Thus, the transceiver may include a transmitter and a receiver. In some embodiments, the transceiver 30 may include one or more communication controllers for various communication protocols. The communication controllers may be coupled to the transmitter and the receiver and may be used to enable communication between the electronic device 10 during normal operation and/or during a low power mode.

The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device. In some embodiments, the power source 29 may include or be representative of a power management unit (PMU) which may control distribution of power throughout the electronic device 10. For example, the power management unit may control power supplied to various subsystems and/or components of the electronic device 10, shut down (e.g., turn off) the subsystems and/or components not currently being used, control sleep and/or power functions of the various subsystems and/or components. In some cases, the power management unit may conserve battery power of the electronic device 10 by turning off the electronic device until a signal is received or until a predefined time period elapses to listen for a wake-up signal.

Figure 2:
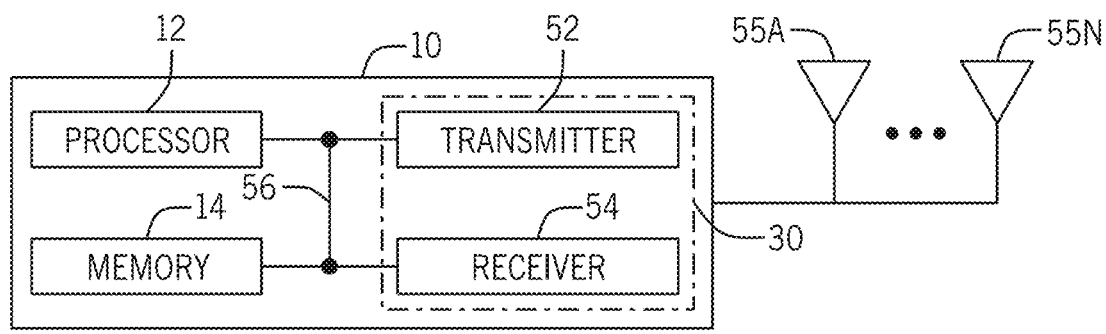
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. In some cases, the transceiver 30 may be referred to herein as a "radio" for a specific communication protocol. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam.

The electronic device 10 may include multiple transmitters, multiple receivers, multiple transceivers, and/or multiple antennas as suitable for various communication standards. For example, for each of a variety of communication protocols (e.g., Thread®, BT, BLE, UWB, near-field communication (NFC)), the electronic device 10 may include a respective transceiver 30 (e.g., having a respective transmitter 52 and a respective receiver 54). In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
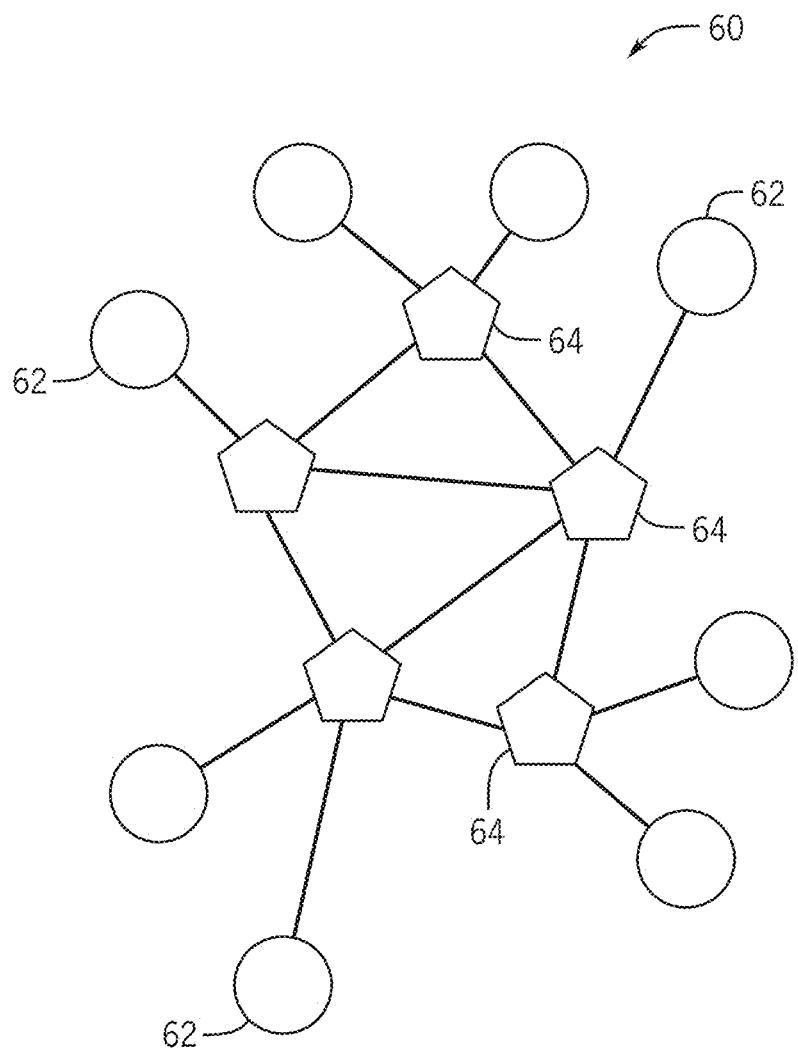
FIG. 3 is a block diagram of a network including various end devices and routers (each of which may include the electronic device of FIG. 1), according to embodiments of the present disclosure.

FIG. 3 is a block diagram of a network 60 including various end devices 62 and routers 64 (each of which may include the electronic device 10 of FIG. 1), according to embodiments of the present disclosure. The network 60 may be representative of a mesh network, such as a Thread® network, as discussed herein. As discussed above, the routers 64 (represented as pentagons) may forward packets (e.g., data) between and/or to the end devices 62 (represented as circles) of the network 60. A router 64 may transmit a packet via a radio or transceiver, such as the transceiver 30 of FIGS. 1 and 2, to a targeted end device 62 via another router 64. The routers 64 may also provide secure commissioning services for other devices attempting to join the network 60. A transceiver of each router 64 may be enabled at times (e.g., all times) to receive and transmit packets.

If a router 64 does not have any children (e.g., communicatively coupled end devices 62), the router 64 may be downgraded to operate as an end device 62. Conversely, if a new end device attempting to join the network 60 is within range of a current end device 62 of the network 60 (but not a router 64), and that end device 62 is eligible to become a router 64, the end device 62 may be upgraded to operate as a router 64 for the new end device. In that case, the new router 64 acts as a router 64 with respect to the new end device and is coupled to one or more other routers 64 of the network 60.

Each end device 62 of the network 60 may communicate primarily with a single router 64. For example, in a typical Thread® network, the end devices 62 may not forward packets for other network devices (e.g., end devices 62 and router 64). In some cases, the end devices 62 are sleepy end devices (SEDs) and may disable their respective transceivers (e.g., in the form of the transceiver 30 of FIGS. 1 and 2) to reduce power consumption. In such cases, the SEDs 62 may wake on occasion to poll for messages from a corresponding router 64. An interval between polling for an SED 62 may be based on a schedule or other configuration of a corresponding transceiver, and may be controlled by a processor and/or PMU of the SED 62, such as the processor 12 and/or the power source 29 of FIG. 1.

As shown, if a router 64 is removed from (e.g., unavailable to) the network 60, the end devices 62 coupled to that router 64 may not be able to communicate directly with other end devices 62 coupled to that router 64 or other end devices 62 of the network 60. Advantageously, embodiments presented herein provide techniques which enable end devices 62 of the network 60 to communicate directly, even when a router 64 is unavailable.

FIG. 4 is a schematic diagram of a communication system 70 including an electronic device 72 and a peripheral device 74 using the network 60 of FIG. 3, according to embodiments of the present disclosure. The electronic device 72 and the peripheral device 74 may include the end devices 62 of FIG. 3, such as sleepy end devices (SEDs). As shown, the electronic device 72 and the peripheral device 74 are communicatively coupled via a router 64. For example, the electronic device 72 may communicate with the router 64 as indicated by the arrow 76 and the peripheral device 74 may communicate with the router as indicated by the arrow 78. The electronic device 72 may communicate with the router 64 using a protocol other than a mesh network protocol (e.g., the Thread® communication protocol), such as Wi-Fi, while the peripheral device 74 may communicate with the router 64 using the mesh network protocol (e.g., the Thread® protocol). For example, the router 64 may convert a Wi-Fi message from the electronic device 72 to the Thread® protocol and transmit the converted Thread® message to the peripheral device 74 using a Thread® radio.

In some cases, a router of the Thread® network may forward information between the Thread® network (e.g., the network 60 of FIG. 3 including the electronic device 72 and the peripheral device 74) and a non-Thread® network 80, such as a Wi-Fi network. In that case, the router 64 may be referred to as a "border router" and convert a Wi-Fi message from the non-Thread® network 80 to the Thread® protocol and transmit the converted Thread® message to the peripheral device 74. The router 64 may also receive a Wi-Fi message from the non-Thread® network 80 and forward that message to the electronic device 72. Communication between the router 64 and the non-Thread® network 80 is represented by the arrow 82.

FIG. 5 is a schematic diagram of a device-to-device communication system 90 including an electronic device 72 and a peripheral device 74, according to embodiments of the present disclosure. As discussed above, a router 64 may convert a received message to a communication protocol used by a target device. For example, the router 64 may convert a Thread® message from the peripheral device 74 to a Wi-Fi message and forward the converted Wi-Fi message to the electronic device 72.

However, if the router 64 is not available, as shown in FIG. 5, the end devices may not be able to communicate directly using the Thread® protocol as indicated by the arrow 92. For example, as an end device, the electronic device 72 may not be able to transmit a packet to another end device, such as the peripheral device 74, when the router 64 communicatively couples the electronic device 72 and the peripheral device 74. Further, the peripheral device 74 may not recognize or receive a packet from the electronic device 72 because the packet is not transmitted from a router. Advantageously, embodiments presented herein enable the electronic device 72 and peripheral device 74 to communicate directly when a router, such as the router 64 of FIGS. 3 and 4, is not available to forward packets therebetween. As an example, the techniques presented herein may be useful when a user of the electronic device 72 is attempting to cause the peripheral device 74 to perform an action based on the Thread® protocol, but the Thread® protocol is unavailable. For example, the electronic device 72 may include a mobile device of the user and the peripheral device 74 may include an electronic door lock. If the peripheral device 74 is configured to communicate via the Thread® protocol, the user may not be able to operate the peripheral device 74 (e.g., lock or unlock the electronic door lock) using a command (e.g., instruction and/or message) via the electronic device 72 if a Thread® router is not available. Embodiments presented herein provide techniques that cause the peripheral device 74 to perform an action based on a message from the electronic device 72 even though the Thread® router is not available. Other example of actions that may be performed by the peripheral device 74 and controlled by the electronic device 72 include starting (or stopping) a motor of a vehicle, turning on (or turning off) an air conditioner or heater (e.g., in a home or vehicle), turning on (or turning off) a faucet, turning on (or turning off) a light, turning on (or turning off) an appliance, and the like.

Figure 6:
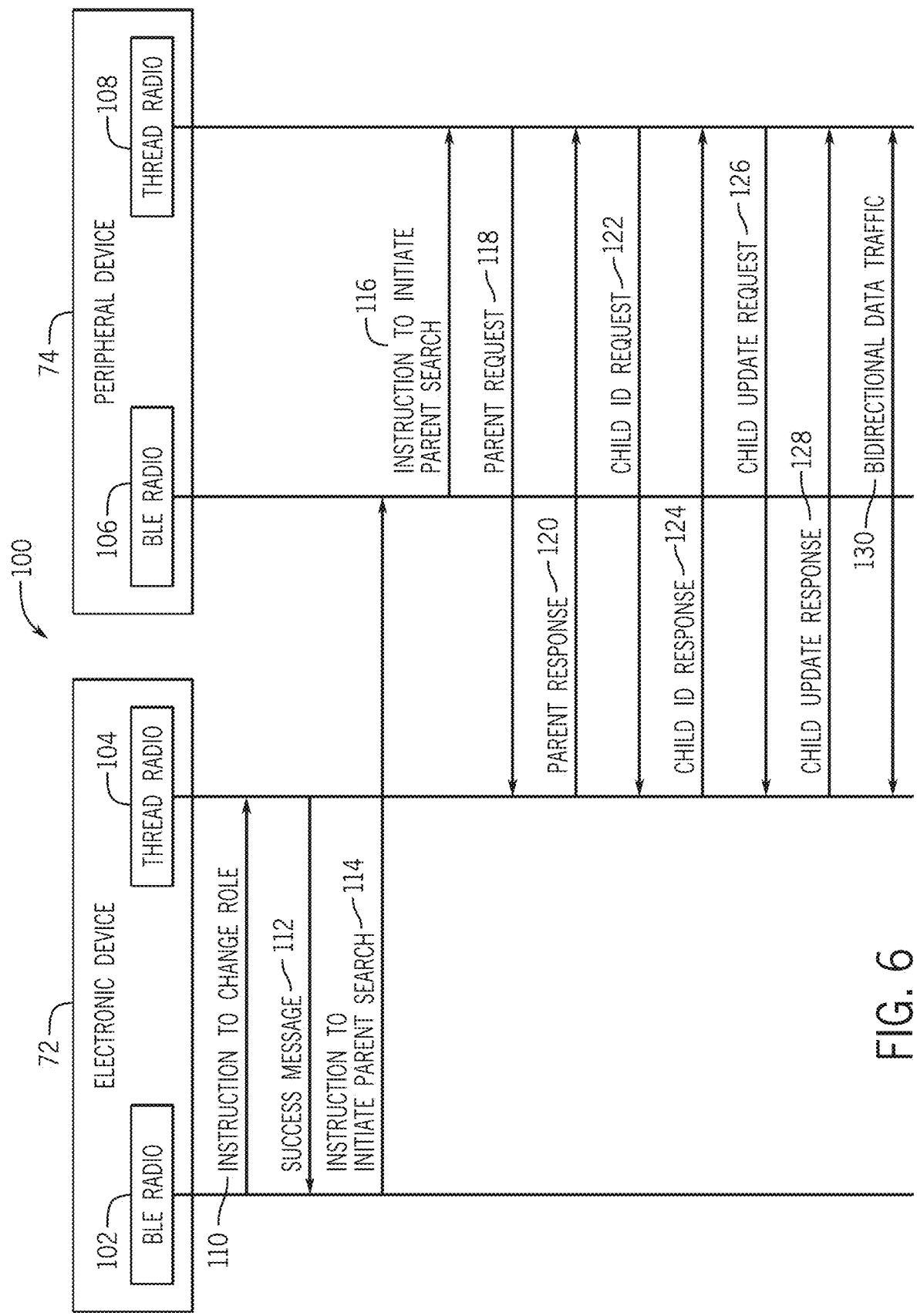
FIG. 6 is a flowchart depicting operations of the electronic device and the peripheral device of FIGS. 4 and 5 when a role of the electronic device changes from an end device to a router, according to embodiments of the present disclosure.

FIG. 6 is a flowchart depicting operations 100 of the electronic device 72 and the peripheral device 74 of FIGS. 4 and 5 when a role of the electronic device 72 changes from an end device to a router, according to embodiments of the present disclosure. It should be understood that while the operations 100 illustrate utilizing Thread®, any other suitable mesh communication protocol may be used, including Zigbee®, Z-Wave®, Bluetooth Low Energy (BLE), ISA100.11a, WirelessHART®, MiWi™, IPv6 over Low-Power Wireless Personal Area Networks (6LoWPAN), Sub-network Access Protocol (SNAP), and the like. Similarly, while the operations 100 illustrate utilizing Bluetooth Low Energy (BLE), any other communication protocol may be used, such as BT, Wi-Fi, UWB, NFC, and so on. As shown, the electronic device 72 includes a BLE radio 102 and a Thread® radio 104. Similarly, the peripheral device 74 includes a BLE radio 106 and a Thread® radio 108. The various radios 102, 104, 106, 108 may be representative of transceivers and/or processors (e.g., including modems), such as the transceiver 30 and the processor 12 of FIGS. 1 and 2, and may be used to communicate (transmit and receive) and facilitate communication via the corresponding communication protocol. It should be understood that the electronic device 72 and the peripheral device 74 may have more or fewer radios than shown. For example, the electronic device 72 and peripheral device 74 may each include a radio for other communication protocols, such as Wi-Fi, UWB, NFC, and the like. The electronic device 72 and the peripheral device 74 may include end devices, such as sleepy end devices (SEDs) according to the Thread® specification, and thus the Thread® radios 104, 108 may normally be disabled (e.g., when not actively polling).

The operations 100 may occur when a router, such as the router 64 of FIGS. 3 and 4, is unavailable. In some cases, the operations 100 may be initiated when a trigger event is detected. The trigger event may be based on a proximity of the electronic device 72 to the peripheral device 74. For example, the trigger event may occur and/or be detected when the electronic device 72 is within a predetermined distance threshold of the peripheral device 74 that is operable for (e.g., enables operation of), for example, BT, BLE, UWB, NFC, and the like. For example, the predetermined distance threshold may be 5 centimeters (cm) or more, 10 cm or more, 1 meter (m) or more, 5 m or more, 8 m or more, 10 m or more, 50 m or more, 100 m or more, 200 m or more, and so on. The trigger event may be additionally or alternatively based on a target action to be performed by the peripheral device 74. The target action may be based on a type of device of the peripheral device 74. For example, if the peripheral device 74 is a door lock, the target action may be unlocking (or locking) the door lock. If the peripheral device 74 is a vehicle, the target action may include starting (or stopping) the engine, locking (or unlocking one or more doors), turning on (or off) a light or siren, and the like. If the peripheral device 74 is an appliance (e.g., washer, dryer, refrigerator, and so on), the target action may include turning the appliance on (or off), adjusting an input (or output) of the appliance, and the like. If the peripheral device 74 is an air conditioner or heater, the target action may include turning the air conditioner or heater on (or off), adjusting the air conditioner or heater, and the like.

At operation 110, the BLE radio 102 on the electronic device 72 may instruct the Thread® radio 104 of the electronic device 72 to change roles from an SED to a Thread® router. At operation 112, the Thread® radio 104 of the electronic device 72 may confirm the role change by sending a confirmation or success message to the BLE radio 102 of the electronic device 72. The success message may indicate that the instruction of operation 110 was received and the role of the electronic device 72 has changed.

At operation 114, the BLE radio 102 of the electronic device 72 may instruct the BLE radio 106 of the peripheral device 74 to initiate a parent search. That is, the BLE radio 106 of the peripheral device 74 may be (e.g., always, periodically, or occasionally) active and listening for a BLE signal. In response, at operation 116, the BLE radio 106 of the peripheral device 74 may instruct the Thread® radio 108 of the peripheral device 74 to initiate a parent search. That is, the Thread® radio 108 of the peripheral device 74 may conduct a parent search by broadcasting one or more messages via the Thread® protocol.

Operations 118-128 correspond to establishing a connection between the electronic device 72 (e.g., the parent device or router) and the peripheral device 74 (e.g., the child device) according to the Thread® specification. The connection between the electronic device 72 and the peripheral device 74 may be established using a Mesh Link Establishment (MLE) procedure according to the Thread® protocol. For example, at operation 118, the peripheral device 74 (e.g., via the Thread® radio 108) may send a multicast request to discover neighboring routers. At operation 120, the electronic device 72 (e.g., via the Thread® radio 104) may transmit a unicast response to the parent request of operation 118 that provides information about the electronic device 72 (e.g., the router).

At operation 122, the peripheral device 74 may transmit a unicast child ID request to establish a parent-child link between the peripheral device 74 and the electronic device 72. At operation 124, the electronic device 72 may transmit a unicast child ID response to confirm that a child-parent link has been established between the electronic device 72 and the peripheral device 74. At operation 126, the peripheral device 74 may send a child update request and, at operation 128, the electronic device 72 may send a child update response. Once the MLE link is established via the operations 118-128, bidirectional communication may proceed between the electronic device 72 and the peripheral device 74 using the Thread® protocol at operation 130. It should be understood that operations 118-128 may be performed using coordinated sampled listening (CSL), according to the Thread® specification.

Advantageously, embodiments presented herein enable the electronic device 72 (e.g., a sleepy end device) of a Thread® network to perform an operation with a peripheral device 74 (e.g., a peer device that is also a sleepy end device) via the Thread® protocol. In some cases, the embodiments herein enable communication between sleepy end devices of a Thread® network to perform a time-critical function (e.g., unlocking a door) even though a conventional Thread® network may not be available.

It should be understood that the role change of the electronic device 72 to act and/or operate as a router may be temporary. For example, the electronic device 72 may act and/or operate as a Thread® router until the communication is completed or until a target action is completed by the peripheral device 74. For example, after the peripheral device 74 completes a target action (e.g., unlocking a door), the role change of the electronic device 72 may be reversed such that the electronic device 72 once again functions and/or operates as a sleepy end device according to the Thread® specification. In other cases, the role change of the electronic device 72 to operate as a Thread® router may be continuous (e.g., permanent), or may be reversed at any time.

Figure 7:
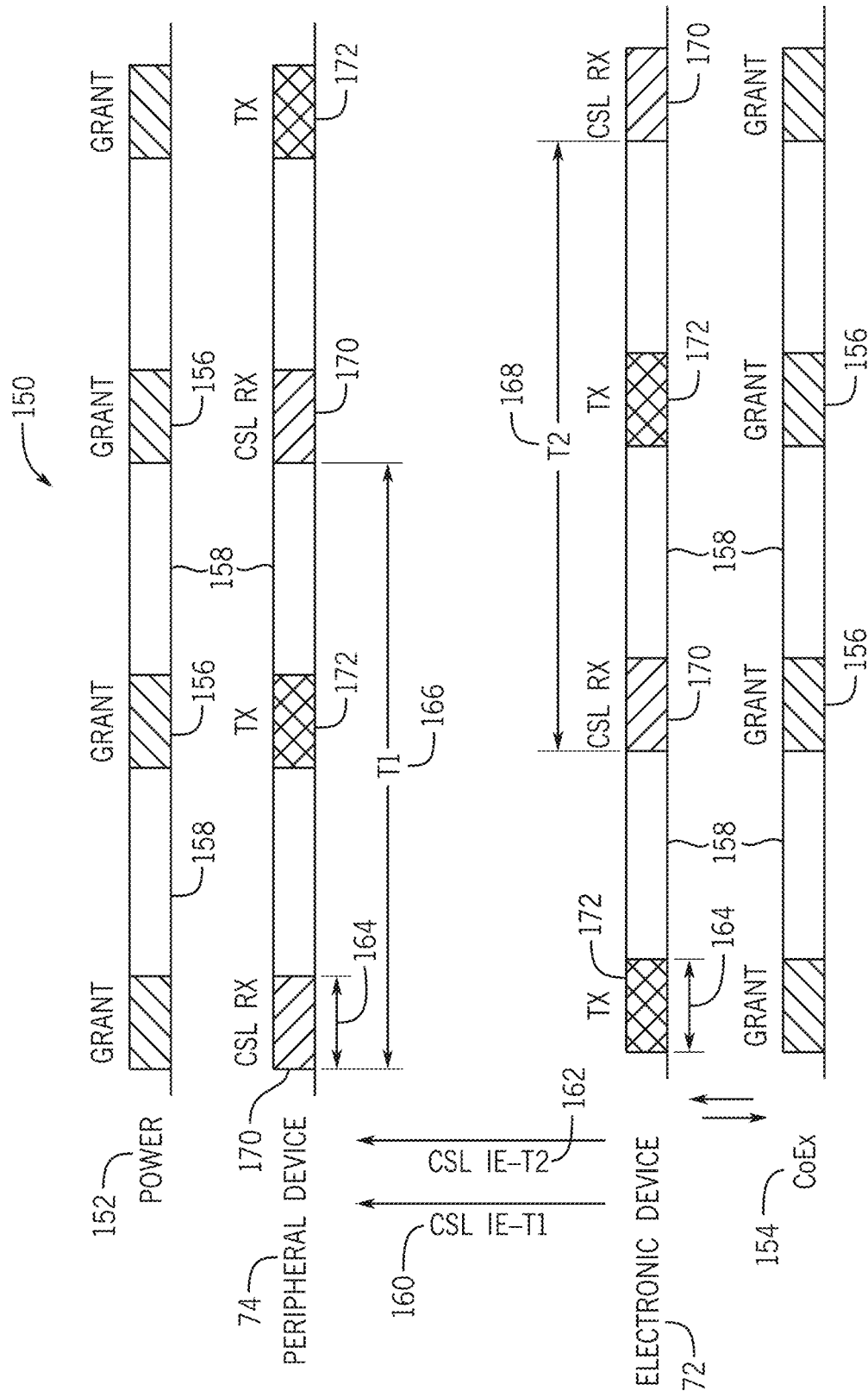
FIG. 7 is a timing diagram for scheduling communication between the electronic device and the peripheral device of FIGS. 4 and 5 when a parent device is unavailable and without changing a role of the electronic device, according to embodiments of the present disclosure.

FIG. 7 is a timing diagram 150 for scheduling communication between the electronic device 72 and the peripheral device 74 of FIGS. 4 and 5 when a parent device is unavailable and without changing a role of the electronic device, according to embodiments of the present disclosure. In some embodiments, a role of the electronic device 72 may not be changed. In that case, the electronic device 72 and the peripheral device 74 may communicate directly (e.g., via a non-Thread® communication protocol). However, because various communication protocols (e.g., BT, BLE, UWB, etc.) used by the electronic device 72 and/or the peripheral device 74 may share resources, conflicts may occur between communication protocols which prevent or interfere with communication between the electronic device 72 and the peripheral device 74. For example, a conflict may arise when communication occurs for two different communication protocols at the same time, such as when there is an overlap in frequency when using the two communication protocols. For example, device-to-device communication (e.g., via a Thread® network) may operate on a 2.4 GHz industrial, scientific and medical (ISM) frequency band, which may interfere with BT communication operating on a 2.4 GHz frequency band. Other communication protocols used by the electronic device 72 and the peripheral device 74 may also interfere with the frequency of device-to-device communications.

To prevent or reduce such interference, a communication scheduler (e.g., a shared resource scheduler 152 and/or coexistence (Co-Ex) manager 154) may obtain receive (RX) and/or transmit (TX) time slots that are broadcast by the electronic device 72 and the peripheral device 74. The RX time slots may indicate when a respective receiver may be active (e.g., turned on), and the TX time slots may indicate when a respective transmitter may be active. Using the RX time slots for the electronic device 72 and the peripheral device 74, the scheduler 152, 154 may coordinate transmission and receipt of signals therebetween. In some embodiments, the scheduler 152, 154 may utilize coordinated sampled listening (CSL) techniques, which include a version of time-division multiple access (TDMA), to determine when the electronic device 72 or the peripheral device 74 may send or receive data. That is, the electronic device 72 and/or peripheral device 74 may operate in a CSL mode where a respective receiver is turned on while the respective device 72, 74 is idle.

The timing diagram 150 illustrates Co-Ex (coexistence) and CSL scheduling for the electronic device 72 and the peripheral device 74, respectively. For example, a top half of the timing diagram 150 illustrates communication time slots of the peripheral device 74 and a bottom half of the timing diagram 150 illustrates communication time slots for the electronic device 72. The scheduler 152, 154 may identify a first subset of time slots during which Thread® messages are guaranteed for transmission and/or reception and a second subset of time slots during which Thread® communication is unavailable because the second subset of time slots are used for other communication protocols, such as BT, Wi-Fi, and the like. For example, time slots 170 and 172 may be reserved for communications using to the Thread® protocol. Time slots 158 may be reserved for communications using a protocol other than the Thread® protocol (e.g., BT, BLE, UWB, Wi-Fi, etc.).

As shown in the timing diagram 150, CSL RX time slots 170 of the electronic device 72 and/or the peripheral device 74 align with the TX time slots 172 of the other device 72, 74. In this way, the scheduler 152, 154 ensures that one device 72, 74 has a receiver turned on while the other device 72, 74 is transmitting. In some cases, the scheduler 152, 154 may alternate the TX time slots 172 and the RX time slots 170 for the electronic device 72 and/or the peripheral device 74. That is, a first time slot for Thread® communication of the electronic device 72 may be a TX slot 172 and a second time slot for Thread® communication of the electronic device 72 may be an RX slot 170.

In some embodiments, the scheduler 152 of the peripheral device 74 and/or coexistence (e.g., Co-Ex) manager 154 of the electronic device 72 may grant or approve time slots 156 to guarantee communication for the various communication protocols. For example, the Co-Ex manager 154 may guarantee a certain number of Thread® communication time slots 170, 172 are available for a given time period. The Co-Ex manager 154 may also ensure that no Thread® communication time slot 170, 172 overlaps with a time slot 158 for another communication protocol. In this way, the Co-Ex manager 154 may prevent a conflict between communication protocols resulting from shared resources. The scheduler 152 and/or Co-Ex manager 154 may execute on and be controlled by the electronic device 72 and/or the peripheral device 74. In some cases, the scheduler 152 and/or the Co-Ex manager 154 may be embodied in the processor 12 executing instructions stored in the memory 14, of FIG. 1.

The scheduler 152 and/or the Co-Ex manager 154 may utilize control messages 160, 162, also referred to as information elements or IEs, for scheduling the various Thread® time slots 170, 172. For example, the control messages may include a frequency 166, 168 of communication for the various communication protocols (e.g., a time for which the respective communication should repeat) and a duration 164 of the time slots 170, 172 (e.g., a duration for each instance of the respective communication). For example, a first control message 160 (e.g., "CSL IE-T1") may be associated with RX time slots 170 and may include a first duration 164 for the RX time slots 170 and a first frequency 166 for the RX time slots 170. A second control message 162 (e.g., "CSL IE-T2") may be associated with the TX time slots 172 and may include a second duration 164 of the TX time slots 172 and a second frequency 168 of the TX time slots 172. In some embodiments, the control messages 160, 162 may also include a duration between respective time slots 170, 172, which may correspond to time slots for messages to be transmitted and/or received according to other communication protocols.

Bluetooth® (BT) or BLE communication may require a specific number of time slots (for communication) in a given time period (e.g., 7.5 milliseconds) and a duration (e.g., 3.75 milliseconds) for each time slot, as defined by the BT specification. Thus, the scheduler 152 and/or the Co-Ex manager 154 may determine a number and a duration 164 of time slots reserved for Thread® communication during the given time period. For example, the scheduler 152 and/or the Co-Ex manager 154 may provide time slots for Thread® communication for the electronic device 72, which total about 10 milliseconds (ms) for every 100 ms.

The scheduler 152 and/or the Co-Ex manager 154 may allocate a remaining time of the BLE time period of 7.5 milliseconds to Thread® communication. For example, the scheduler 152 and/or the Co-Ex manager 154 may allocate 3.75 milliseconds (e.g., 7.5 milliseconds minus 3.75 milliseconds for BLE) for Thread® communication. In some cases, the allocated time for Thread® communication may be a single time slot. In other cases, the allocated time for the Thread® communication may be divided between more than one time slot.

The scheduler 152 and/or Co-Ex manager 154 of the electronic device 72 may jointly allocate time slots (e.g., time slots 158, 170, 172) for communication between the electronic device 72 and the peripheral device 74. Additionally or alternatively, a scheduler 152 and/or Co-Ex manager 154 of the peripheral device 74 may allocate time slots (e.g., time slots 158, 170, 172) for communication between the peripheral device 74 and the electronic device 72. In some embodiments, if the time slots 158, 170, 172 allocated by the electronic device 72 match or correlate to the time slots 158, 170, 172 allocated by the peripheral device 74, peer-to-peer communication may begin using those the matching time slots 158, 170, 172. If the time slots do not match, the scheduler 152 and/or Co-Ex manager 154 of one device (e.g., the electronic device 72 or the peripheral device 74) may adjust the corresponding time slots to match or correlate to the time slots (e.g., the time slots 158, 170, 172) allocated by the scheduler 152 and/or Co-Ex manager 154 of the other device. Advantageously, the scheduler 152 and/or the Co-Ex manager 154 enable the electronic device 72 and the peripheral device 74 to communicate via the Thread® protocol while reducing or preventing interference with other communication protocols.

Figure 8:
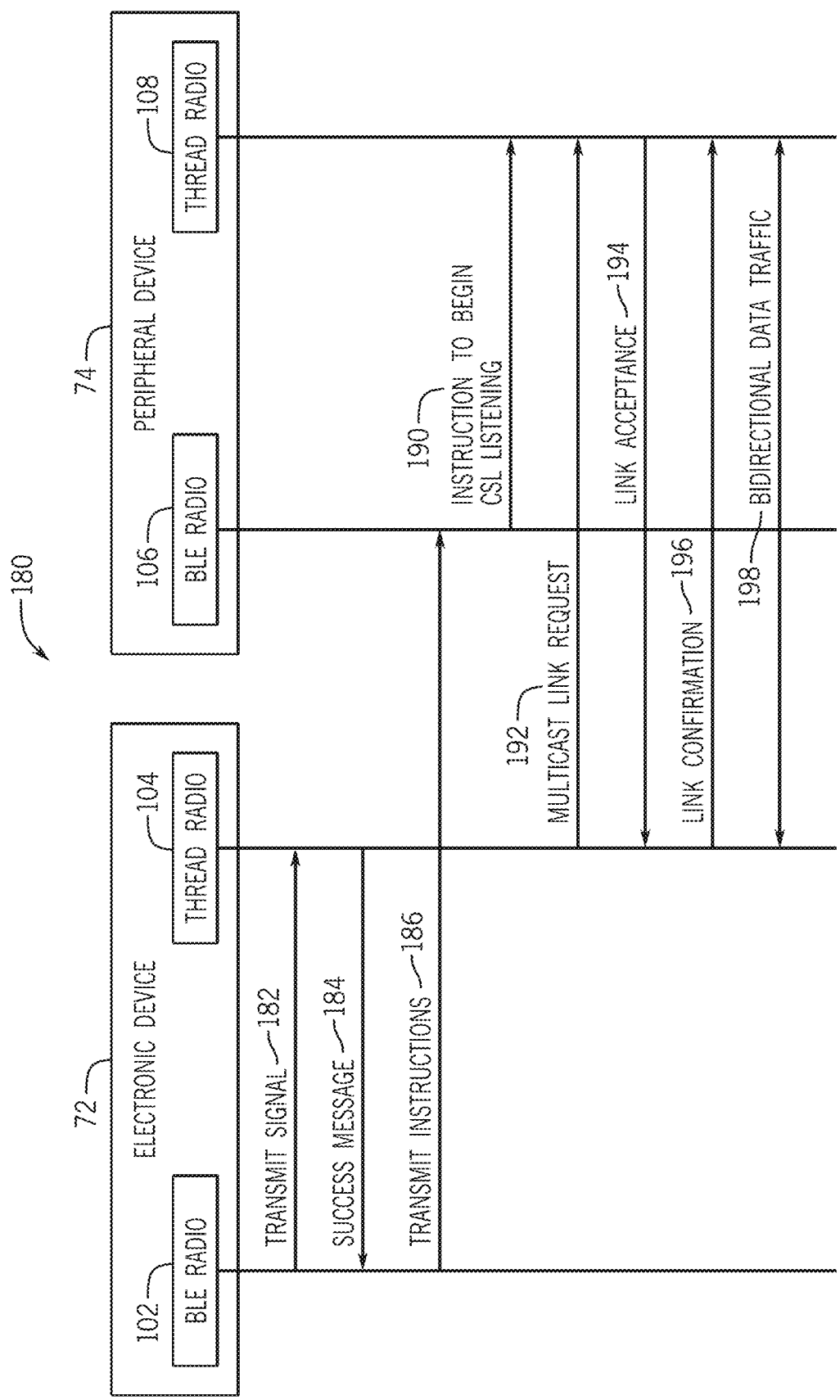
FIG. 8 is a flowchart depicting operations of the electronic device and the peripheral device of FIGS. 4 and 5 using coordinated sampled listening when a parent device is unavailable and without changing a role of the electronic device, according to embodiments of the present disclosure.

FIG. 8 is a flowchart depicting operations 180 of the electronic device 72 and the peripheral device 74 (e.g., sleepy end devices) of FIGS. 4 and 5 using coordinated sampled listening (CSL) when a parent device is unavailable and without changing a role of the electronic device, according to embodiments of the present disclosure. It should be understood that while the operations 180 illustrate utilizing Thread®, any other suitable mesh communication protocol may be used, including Zigbee®, Z-Wave®, Bluetooth Low Energy (BLE), ISA100.11a, WirelessHART®, MiWi™, IPv6 over Low-Power Wireless Personal Area Networks (6LoWPAN), Subnetwork Access Protocol (SNAP), and the like. Similarly, while the operations 180 illustrate utilizing Bluetooth Low Energy (BLE), any other communication protocol may be used, such as BT, Wi-Fi, UWB, NFC, and so on. As discussed above, CSL techniques may be used for communication between the electronic device 72 and the peripheral device 74 even if, for example, a role of the electronic device 72 and/or the peripheral device 74 are not changed. That is, CSL techniques may be used to enable Thread® communication between the electronic device 72 and the peripheral device 74 (e.g., sleepy end devices) even though a Thread® router is not available.

In some embodiments, the operations 180 may be initiated when a trigger event is detected. As discussed above, the trigger event may be based on a proximity of the electronic device 72 to the peripheral device 74. For example, the trigger event may be detected when the electronic device 72 is within a predetermined distance threshold of the peripheral device 74 that is operable for, for example, BT, BLE, UWB, NFC, and the like. Additionally or alternatively, the trigger event may be further based on a target action to be performed by the peripheral device 74. The target action may be based on a type of device of the peripheral device 74. For example, if the peripheral device 74 is a door lock, the target action may be unlocking (or locking) the door lock.

Similar to the flowchart of FIG. 6 discussed above, the electronic device 72 includes a BLE radio 102 and a Thread® radio 104, and the peripheral device 74 includes a BLE radio 106 and a Thread® radio 108. The various radios 102, 104, 106, 108 may be representative of transceivers and/or processors (e.g., including modems), such as the transceiver 30 and the processor 12 of FIGS. 1 and 2 and may be used to communicate (transmit and receive) and facilitate communication via the corresponding communication protocol. It should be understood that the electronic device 72 and the peripheral device 74 may have more or fewer radios than shown. For example, the electronic device 72 and peripheral device 74 may include a radio for other communication protocols, such as Wi-Fi, UWB, NFC, and the like. The electronic device 72 and the peripheral device 74 may be sleepy end devices (SEDs) according to the Thread® specification, and thus the Thread® radios 104, 108 may normally be disabled.

The operations 180 begin at operation 182, where the BLE radio 102 of the electronic device 72 may transmit wake-up frames to a Thread® radio of the electronic device 72. The wake-up frames may be sent via any suitable communication protocol, including Wi-Fi, BT, BLE, UWB, NFC, and the like. That is, because the electronic device 72 is a sleepy end device with respect to Thread® communication, and thus the Thread® radio 104 of the electronic device 72 may be idle or inactive until a predetermined time, the wake-up frames may be sent via a protocol other than Thread®. In some embodiments, the wake-up frames may be transmitted to the Thread® radio 104 using a different communication protocol that is available to and via radios that are included in both the electronic device 72 and the peripheral device 74 (e.g., Wi-Fi, UWB, NFC, etc.). In some cases, the wake-up frames may include coordinated sampled listening (CSL) information (e.g., informational elements and/or control messages) for communicating with the peripheral device 74 via the Thread® protocol, as discussed below.

At operation 184, the Thread® radio of the electronic device 72 may send a success message to the BLE radio 102 of the electronic device 72. The success message may indicate that the wake-up instruction of operation 182 was received. In some cases, the electronic device 72 may attach to a Thread® router as a child device or may remain idle to search for a parent device (e.g., a router).

At operation 186, the BLE radio 102 of the electronic device 72 may send instructions to the BLE radio 106 of the peripheral device 74. The instructions may include wake-up frames and/or instructions to begin coordinated sampled listening (CSL) via the Thread® radio 106 of the peripheral device 74. The instructions may be sent to the peripheral device 74 via the BT/BLE protocol because the peripheral device 74 is a sleepy end device according to the Thread® protocol. Thus, the BLE radio 106 of the peripheral device 74 may always be active, and thus continuously listening for BT and/or BLE signals.

A scheduler may obtain TX and/or RX time slots for the electronic device 72 and the peripheral device 74 for CSL. That is, the scheduler may determine which time slots are reserved for synchronized CSL to reduce an occurrence of interference of communications between the electronic device 72 and the peripheral device 74. The instructions may include CSL information (e.g., informational elements and/or control messages) for the electronic device 72 to communicate with the peripheral device 74 via the Thread® protocol. For example, the CSL information may include a frequency of communication for the various communication protocols and a duration of the time slots for each communication protocol. In some cases, the CSL information may include a different frequency channel for the various communication protocols that may be used to avoid interference with other communication protocols. At operation 190, the BLE radio 106 of the peripheral device 74 may transmit a signal to the Thread® radio 108 of the peripheral device 74 to begin CSL listening. The signal at operation 190 may be a BLE signal and may include wake-up frames for the Thread® radio 108 of the peripheral device 74.

At operation 192, the Thread® radio 104 of the electronic device 72 may transmit a multicast link request to the Thread® radio 108 of the peripheral device 74. At operation 194, in response to the multicast link request, the Thread® radio 108 of the peripheral device 74 may transmit a unicast acceptance to the Thread® radio 104 of the electronic device 72. At operation 196, the Thread® radio 104 of the electronic device 72 may transmit a unicast confirmation of the communication link to the Thread® radio 108 of the peripheral device 74.

Once the communication link (e.g., a mesh link, MLE) is established at operation 192-196, bidirectional communication may proceed between the Thread® radio 104 of the electronic device 72 and the Thread® radio 108 of the peripheral device 74 using the Thread® protocol, at operation 198. It should be noted that establishment of the communication link between the electronic device 72 and the peripheral device 74 at operations 190-196 may be performed using synchronized coordinated sampled listening (CSL), as determined by the scheduler, to prevent or substantially reduce an occurrence of interference with other communication protocols.

Embodiments presented herein provide techniques for sleepy end devices to communicate directly via the Thread® communication protocol without the need for a router or parent device. In this way, sleepy end devices of a Thread® network may reduce a latency of performing a target action by decreasing a number of devices to transmit a message and by enabling sleepy end device to communicate directly with one another even if an associated Thread® network is not available. Further, the reduced number of devices to transmit a message improve an efficiency of communication between sleepy end devices and reduce an amount of resources needed to transmit the message.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
receiving, by processing circuitry, a first set of time periods for receiving first data using a receiver of an electronic device or preparing, by the processing circuitry, the first data for transmission by a transmitter of the electronic device via a first communication protocol; and
causing the receiver to receive second data or causing the transmitter to transmit the second data directly to a peripheral device without a routing device via a second communication protocol during a second set of time periods based on a loss of communication with the routing device, the second set of time periods being based on the first set of time periods.

2. The method of claim 1, wherein the first set of time periods and the second set of time periods do not overlap.

3. The method of claim 1, wherein the second set of time periods is determined based on coordinated sampled listening.

4. The method of claim 1, wherein the receiver is configured to receive the second data directly from the peripheral device via the second communication protocol, or the transmitter is configured to transmit the second data directly to the peripheral device via the second communication protocol.

5. The method of claim 1, wherein the first communication protocol comprises a Bluetooth Low Energy (BLE) protocol.

6. The method of claim 1, wherein the second communication protocol comprises a Thread communication protocol.

7. The method of claim 1, wherein the electronic device and the peripheral device each comprise a sleepy end device.

8. An electronic device comprising:
a receiver configured to receive first data from a sleepy end device via a communication protocol through a routing device, the first data comprising an indication of a trigger event;
a transmitter configured to transmit second data to the sleepy end device via the communication protocol through the routing device;
processing circuitry configured to:
cause the electronic device to communicate directly with the sleepy end device according to the communication protocol;
cause the transmitter to transmit an instruction directly to the sleepy end device to perform a target action; and
cause the electronic device to communicate with the sleepy end device via the communication protocol through the routing device based on the sleepy end device performing the target action.

9. The electronic device of claim 8, wherein the trigger event is based on the target action to be performed by the sleepy end device.

10. The electronic device of claim 8, wherein the target action comprises actuation of an electric lock.

11. The electronic device of claim 8, wherein the target action comprises starting or stopping a vehicle engine.

12. The electronic device of claim 8, wherein the processing circuitry is configured to cause the electronic device to communicate directly with the sleepy end device based on determining that the routing device is unavailable to cause communication between the receiver, the transmitter, and the sleepy end device.

13. The electronic device of claim 8, wherein the trigger event is based on a proximity of the electronic device to the sleepy end device.

14. A method, comprising:
receiving, via a transceiver of an electronic device, one or more control messages comprising a frequency and duration associated with a first set of time periods for communication with a peripheral device via a first communication protocol through a parent device;
receiving, via processing circuitry, a second set of time periods for communicating via a second communication protocol based on the frequency and the duration associated with the first set of time periods; and
configuring the transceiver of the electronic device to communicate directly with the peripheral device according to the first communication protocol based on a proximity of the electronic device to the peripheral device.

15. The method of claim 14, wherein the electronic device comprises a sleepy end device.

16. The method of claim 14, wherein configuring the transceiver to communicate directly with the peripheral device comprises changing a role of the electronic device according to the first communication protocol.

17. The method of claim 16, wherein the role of the electronic device is changed based on a comparison of the proximity to a proximity threshold.

18. The method of claim 14, wherein the first communication protocol comprises a mesh link establishment protocol.

19. The method of claim 14, wherein configuring the transceiver to communicate directly with the peripheral device according to the first communication protocol comprises configuring the transceiver to communicate directly with the peripheral device during the first set of time periods.

20. The method of claim 14, comprising configuring a second transceiver to communicate according to the second communication protocol during the second set of time periods.

* * * * *